United States Patent [19]

Sangster

[11] Patent Number: 4,496,262

[45] Date of Patent: Jan. 29, 1985

[54] LINKING MEANS

[76] Inventor: George G. Sangster, 1719 E. Claremont, Phoenix, Ariz. 85016

[21] Appl. No.: 383,676

[22] Filed: Jun. 1, 1982

[51] Int. Cl.³ ............................................. F16B 5/07
[52] U.S. Cl. ................................... 403/335; 403/336; 403/353; 52/726; 52/583; 248/225.2; 248/223.4; 5/295; 211/193; 256/65
[58] Field of Search ....................... 403/335, 336, 353; 52/726, 583, 594, 578, 582, 584, 588, 721, 740; 248/225.2, 223.4, 235, 243; 5/294, 295, 300; 211/193, 189, 190, 191; 256/65, 70, 59

[56] References Cited

U.S. PATENT DOCUMENTS

| 1,136,999 | 4/1915 | Bondy | 256/65 X |
| 3,499,631 | 3/1970 | Heldenbrand | 256/59 X |
| 3,589,755 | 6/1971 | King | 52/282 X |
| 3,784,025 | 1/1974 | Dumit | 211/189 |
| 4,134,564 | 1/1979 | Hanna | 403/353 X |
| 4,159,601 | 7/1979 | Ebert et al. | 248/243 X |
| 4,306,634 | 12/1981 | Sangster . | |

FOREIGN PATENT DOCUMENTS 608480  9/1948  United Kingdom ............... 248/243

Primary Examiner—Cornelius J. Husar
Assistant Examiner—Joseph A. Fischetti
Attorney, Agent, or Firm—Richard R. Mybeck

[57] ABSTRACT

A linking means is disclosed for releasably connecting and quickly disconnecting two relatively discrete members in longitudinally aligned load bearing or load transmitting relationship to each other. The discrete members are connected by the coaction of hook-like flanges strategically disposed upon one member with angularly disposed retainer flanges disposed upon the other discrete member and the containment of a portion of one member between spaced outreaching flange members integrally formed upon said second member while a portion of the confronting edges of both members engage.

By disengaging the confronting edges of the member and vertically moving the first member relative to said second member, a quick disconnect is achieved.

16 Claims, 11 Drawing Figures

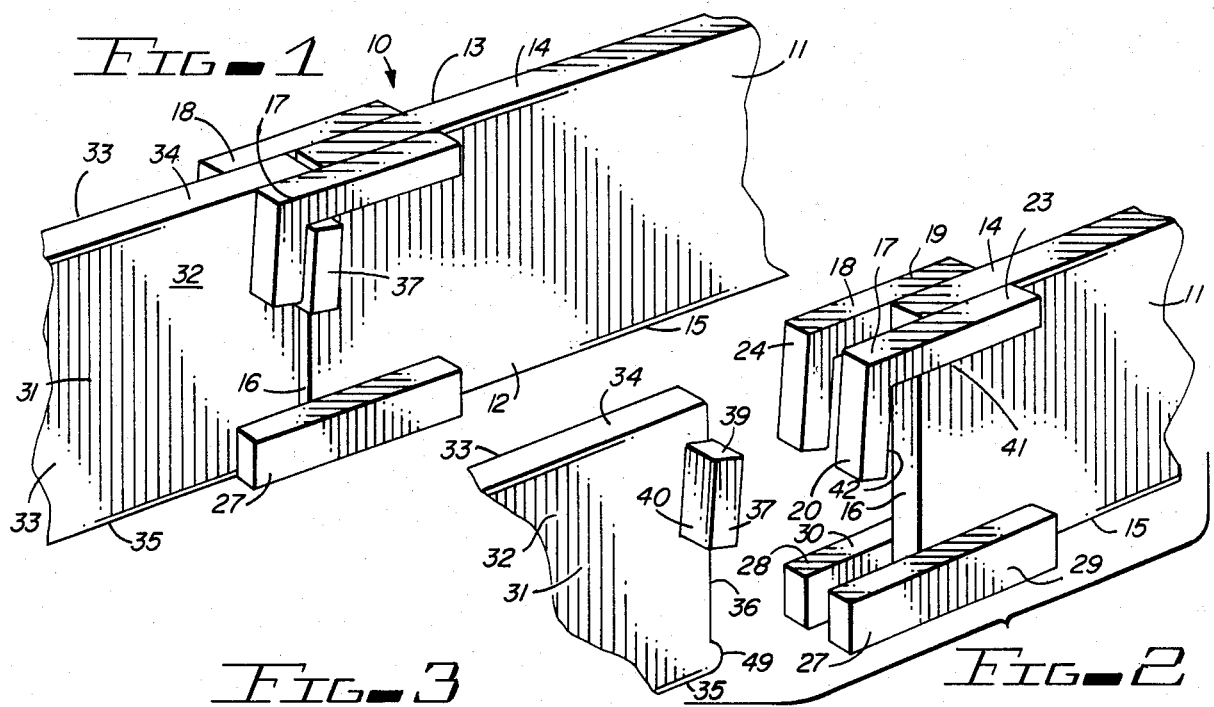
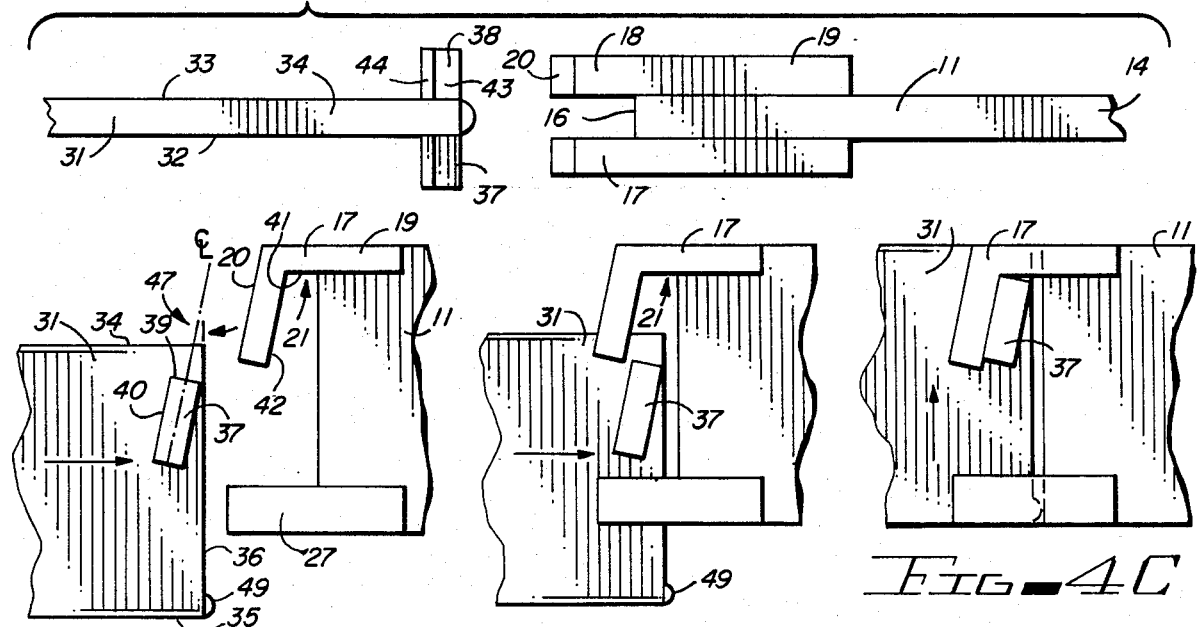
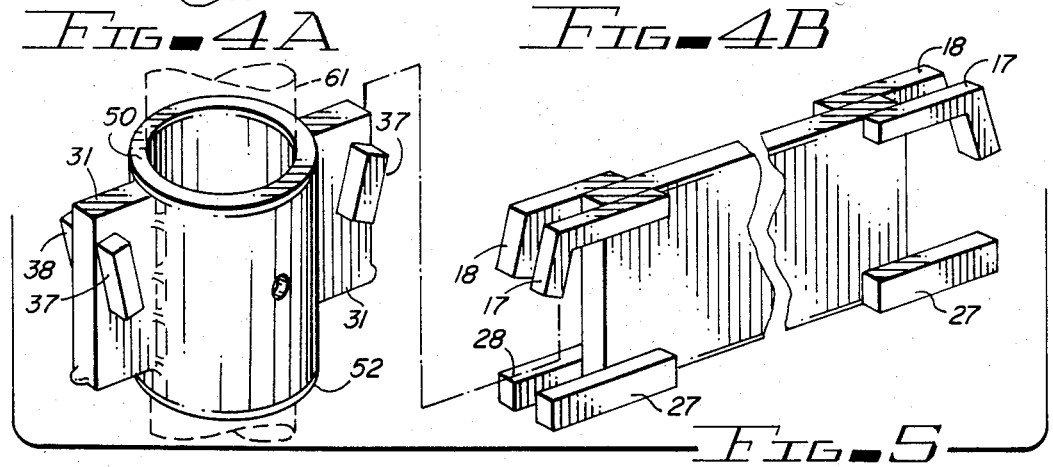

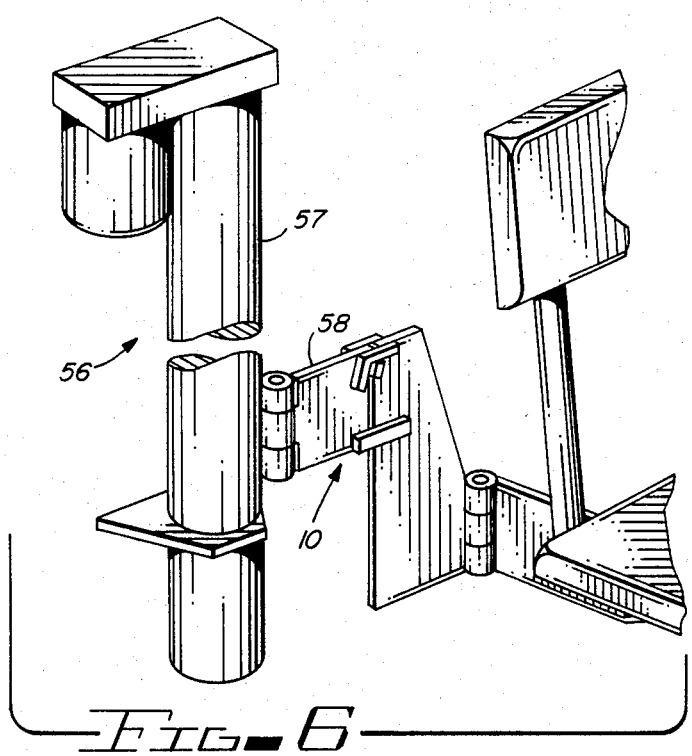
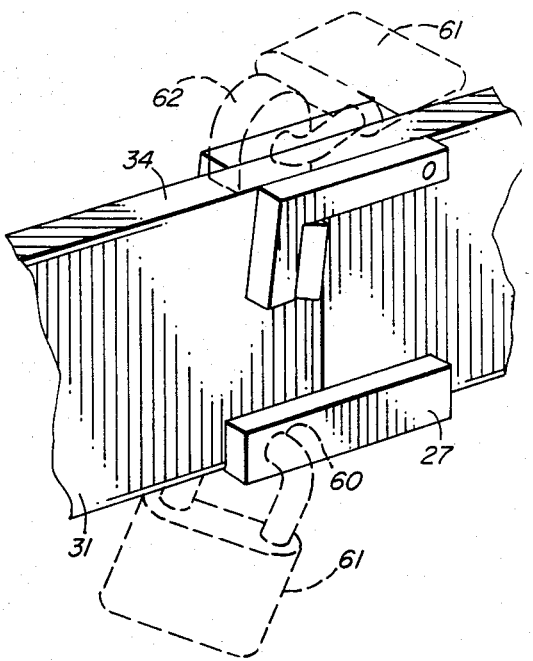
Fig. 6
Fig. 7
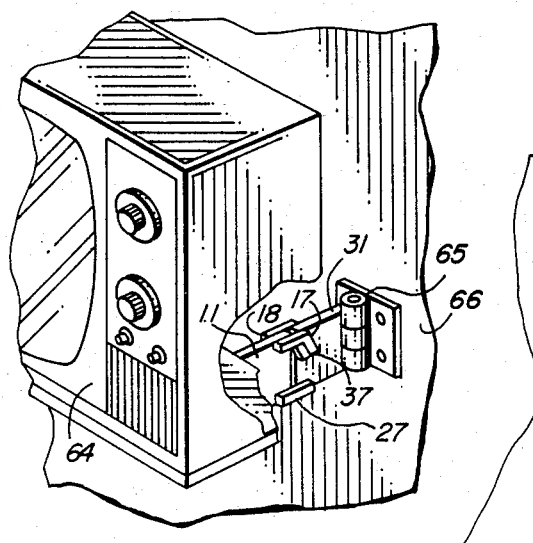
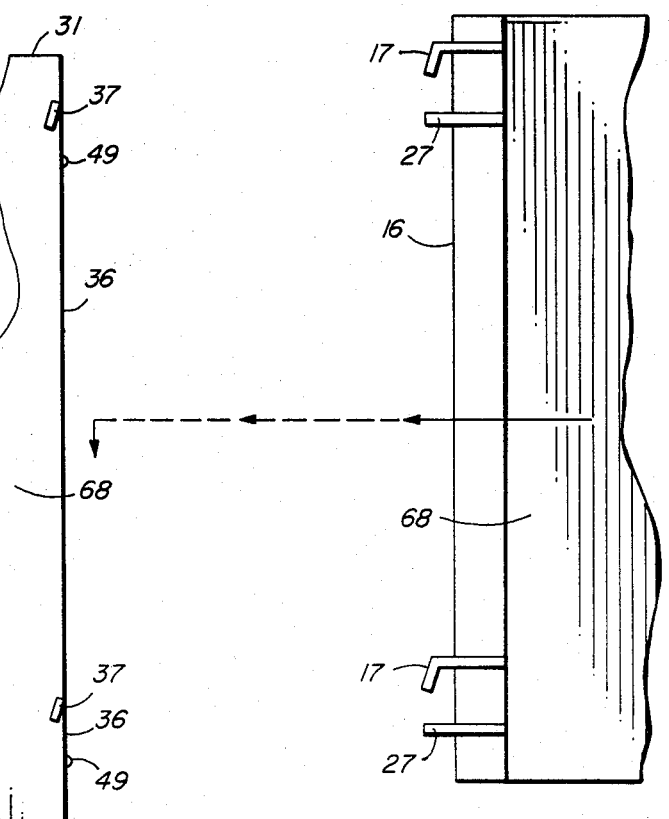
Fig. 8
Fig. 9

LINKING MEANS

INTRODUCTION

The present invention relates generally to linking means and more particularly to means for joining two adjacent discrete members in secure longitudinal alignment with each other for load bearing or load transmitting relationship while permitting a quick disconnect to be achieved when it is necessary or desirable to separate the members into a plurality of parts for storage or other purposes.

BACKGROUND OF THE INVENTION

A search of the prior art failed to uncover any patents which disclosed the quickly disconnectable linking means of the present invention. One recent patent, namely, Snapp, U.S. Pat. No. 4,141,665 was located which presented a fairly detailed description of the prior art relating to lockable joints for articulated members but none were of sufficient relevance to merit further mention here.

Of course, connection of adjacent parts by hinge pins, overlaps and other means introducing a third or more discrete parts have been previously utilized but as will become manifest from the succeeding description, are not germane to the instant disclosure.

SUMMARY AND OBJECTS OF THE INVENTION

The present invention is directed to a linking means for releasably connecting and quickly disconnecting two adjacent discrete members in load bearing or load transmitting relationship to each other. By use of the present invention, an easily assembled quickly disassembled connection is obtainable between two adjacent discrete members which enables one to support the other, to push the other, or to pull the other without inadvertent disconnection while, when disconnection is desired, allowing it to be achieved in a quick, easy and non-strenuous fashion.

Accordingly, the principal object of the present invention is to provide a novel and unique linking means which is secured to and integral with the discrete members being joined thereby eliminating the need for additional parts and tools to effectuate the connection or the disconnection.

Another object of the present invention is to provide a linking means which can be readily and easily used to connect or disconnect two discrete adjacent members.

A further object of the present invention is to provide a linking means which is equally useful in assembling modular wall units, fences, articulated lift platforms, and mounting appliances to stationary locations.

These and still further objects as shall hereinafter appear are fulfilled by the present invention in a remarkably unexpected fashion as can be readily discerned from a careful consideration of the following detailed description of the preferred embodiments thereof, especially when read in conjunction with the accompanying drawing in which like parts bear like indicia throughout the several views.

DESCRIPTION OF DRAWING

In the drawing:

FIG. 1 is an isometric showing partially broken away of a quick disconnect device embodying the present invention in its connected position;

FIG. 2 is an isometric showing of the device of FIG. 1 in its disconnected position;

FIG. 3 is a plan elevation of the device shown in FIG. 2;

FIG. 4A is a side elevation of the device of FIG. 1 in its disconnected position;

FIG. 4B is a side elevation of the device of FIG. 1 partially moved toward its connected position;

FIG. 4C is a side elevation of the device of FIG. 1 in its connected position;

FIG. 5 is an exploded view of an alternate embodiment of the present invention when used to connect fencing and like members;

FIG. 6 is an isometric showing of the device of FIG. 1 when employed in a chair lift mechanism;

FIG. 7 is an isometric showing of another variation of the device of FIG. 1 when security considerations require locking means to be interposed therewith;

FIG. 8 is an isometric illustration of another embodiment of the present invention when used to secure an appliance to a stationary structure such as a wall surface; and FIG. 9 is a side elevation showing another embodiment of the present invention adapted to interconnect adjacent panels in modular wall construction.

DETAILED DESCRIPTION OF INVENTION

Referring to the drawing, the device of the present invention, identified at 10, comprises a first member 11 and a second member 31. The first member 11 has front and rear (relative to the drawing) surfaces 12, 13, respectively, an upper edge 14, a lower edge 15 and a leading edge 16. Adjacent upper edge 14 and respectively secured to opposite surfaces 12, 13 are a pair of outwardly extending flanges 17, 18.

Each flange, for instance flange 17, comprises an axially extending body portion 19 and an angularly disposed end portion 20 formed integrally with and coacting with body portion 19 to define an interior angle 21 of approximately 115°–125°.

In a similar fashion, flange 18 comprises a body portion 23, an angularly disposed end portion 24 and an interior angle 25 of approximately 115°–125°.

Flange members 17, 18 are secured to surfaces 12, 13 by any suitable means as by welding, cement and the like and are disposed in substantial registry with each other.

A second pair of flange members 27, 28 are disposed in substantial registry with each other on surfaces 12, 13, respectively, adjacent lower edge 15 and secured to member 11 in the same fashion as are flanges 17, 18.

Each of said second pair of flanges, for instance flange 27, generally defines an elongated body having a portion 29 extending outwardly beyond leading edge 16 approximately the same distance as that which is defined between leading edge 16 and the foremost portion 22 of end portions 20, 24 of flanges 17, 18, that is, about one-third of its total length.

A similar portion 30 is defined by flange 28.

Second member 31 likewise has a front and a rear (relative to the drawing) surface 32, 33, respectively, an upper edge 34, a lower edge 35 and a leading edge 36. Adjacent upper edge 34 and disposed in spaced relationship thereto in registry with each other are a pair of flange members 37, 38.

Each flange member, for example, member 37, is secured to member 31 as by welding and the like and comprises an upper surface 39 and a bearing surface 40 which coacts, as will hereinafter appear in greater detail, with corresponding surface 41 of body portion 19 and surface 42 of end portion 20.

In a similar fashion, flange member 38 presents upper surface 43 and bearing surface 44 for coaction with surface 45 of body portion 23 and surface 46 of end portion 24.

Flange members 37, 38 are disposed so that the axial center line thereof (identified in FIG. 4A as "$C_L$") when extended for intersection with the plane of leading edge 36 defines therewith an interior angle 47, 48 respectively of approximately 25°–35°.

Finally second member 31 comprises a bumper member 49 disposed on leading edge 36 at or near lower edge 35 for engagement, as will hereinafter appear, with leading edge 16 of member 11 when device 10 is in its secured position.

An alternative embodiment of the present invention for creating fencing and other enclosures is shown at FIG. 5 and comprises an elongated first member 11 having flanges 17, 18, 27 and 28 mounted on both ends thereof in the same manner as has been described.

A pair of second members 31, 31 are integrally formed with or otherwise secured, in axial opposing relationship to each other, to a cylindrical collar 50 which is adapted to fit over a tubular fence post 61 (in phantom) and secured thereto as with a set screw 52.

While it is not illustrated, it is understood that second members 31, 31 may be disposed at 90° from each other relative to collar 50 to define a corner post and that three or four members 31 can be disposed upon collar 50 depending upon the configuration of the enclosure with which it is used and not depart from the spirit of the present invention.

Referring to FIG. 6, the device 10 of the present invention is shown in connection with a lifting mechanism of the type described and illustrated in my earlier patent U.S. Pat. No. 4,306,634. As shown, lift mechanism 56 comprises an assemblage 57 which is permanently installed as to a motor home (not shown) and an assemblage 58 which, preferably is detachable as when the motor home is moving. The device 10, when installed between assemblages 57 and 58 permits the detachable portion to be quickly and easily connected and disconnected as will appear in more detail in my further description.

FIG. 7 illustrates the present invention when it is desired to achieve further security to the linkage. Thus, if desired, a hole 60 may be drilled through flanges 27, 28 and second members 31 to receive the hasp of a conventional padlock 61 which when in place prevents the movement necessary to disconnect device 10. Alternatively a lock receiving member 62 may be welded to upper edge 34 of member 31 so that when padlock 61 is locked therethrough, as shown in phantom, the relative movement between members 11 and 31 necessary to effect the quick disconnect cannot be achieved.

In another embodiment of the present invention, member 11 can be formed as a short extension having at the distal end thereof means (not shown) associated therewith for securing member 11 to an appliance such as television set 64 while member 31 is formed in a similar fashion and in turn, is pivotally connected as by hinge assembly 65 to wall 66.

Such an application is especially useful for hospitals, convalescent homes and other situations where it desired to locate the appliance in a position other than on a table or chest and the like. If such an installation is employed in an inn or other type of commercial establishment where theft poses a problem, a locking device can be incorporated into the assembly as shown in FIG. 7.

Still another variation of the present invention is shown as FIG. 9 where in first member 11 and second member 31 are actually opposing edges of a common member such as for example as a modular wall panel 68 and a plurality of devices 10 can be strategically disposed to assure a secure linkage.

Specifically, adjacent edge 36 of wall panel 68 presents a preselected number of flanges 37 secured to surface 32 while a like number of flanges 38 are secured to the rear surface (not shown) thereof and coact with a like number of bumper means 49 disposed on edge 36 to define the second member 31 of device 10.

Edge 16 of the adjacent panel (as well as the remote edge of the original panel) likewise present a corresponding number of engaging assemblies, each comprising an upper flange 17 and a lower flange 27 (with upper flange 18 and lower flange 28 respectively in registry therebehind).

Thus, as edge 16 is brought toward edge 36 so that flanges 17, 18 pass over flanges 37, 38, respectively, and then is settled into position as previously described, devices 10 are connected and the adjacent panels are secured for use.

To disassemble any of the foregoing connections, the operator merely raises the member corresponding to the first member hereof and moves it away from the designated second member until end portions 20, 24 clear their respective flanges 37, 38 and the members are free.

From the foregoing it is readily apparent that the invention herein described and illustrated fulfills all of the aforestated objects in a remarkably unexpected fashion. It is of course understood that such alterations, modifications or adaptations as may readily occur to the artisan confronted with this disclosure are intended with the spirit of this invention which is limited solely by the scope of the claims appended hereto.

What is claimed is:

1. A quick disconnect linking device for joining two adjacent discrete members to each other comprising: a first member and a second member said first member having a body portion having a front and rear surface, an upper and lower edge extending between said surfaces, and a leading edge extending between said upper and lower edge and between said surfaces; a first pair of outwardly extending flanges respectively secured one to each of said surfaces adjacent said upper edge, each of said first pair of flanges being disposed in spaced registered relationship to the other flange of said pair and having an axially extending body portion and an end portion formed integrally with said body portion and angularly disposed thereto and defining an interior angle therewith of approximately 115–125 degrees, said end portion being disposed in spaced relationship to said leading edge and defining a gap therebetween; and a second pair of outwardly extending flanges respectively secured, one to each of said surfaces adjacent said lower edge in spaced relationship to said first pair of flanges, each of said second pair of flanges being disposed in spaced registered relationship to the other flange of said pair and having an elongated body portion extending outwardly beyond said leading edge approximately the same distance as does said end portion of each of said first pair of flanges and adapted to sandwich a portion of said second member therebetween; and said second member having a pair of flanges integrally formed therewith in spaced registered relationship to each other and adapted, when said first member is brought into axially aligned physical proximity to said second member, to engage and support the corresponding one of said first pair of flanges on said first member while fitting between said second pair of flanges on said first member.

2. A device according to claim 1 in which said second member includes means for securing said member to a structure to support an appliance having said first member formed therewith.

3. A device according to claim 1 in which a plurality of said first members are secured to the leading edge of a modular construction unit and a corresponding number of said second members are secured to the trailing edge of said unit, whereupon a plurality of such construction units can be serially connected by respectively raising, engaging, and lowering the leading edge of the unit to be secured relative to the trailing edge of a previously secured unit.

4. A device according to claim 1 in which said second member comprises a body portion having front and rear surfaces, an upper and lower edge extending between said surfaces, and a leading edge extending between said upper and lower edges and between said surfaces; a pair of flanges respectively secured one to each of said surfaces adjacent said upper edge in spaced relationship thereto and in registry with each other, each of said flanges being positioned relative to said leading edge so that an extension of the axial center line of each flange defines with the plane of said leading edge an interior angle of 24–35 degrees, each of said flanges having an upper surface and a bearing surface adapted to engage and support a corresponding one of said first pair of outwardly extending flanges of said first member when said first member and said second members are connected to each other; and a bumper member disposed upon said leading edge near the lower edge thereof and adapted to engage the leading edge of said first member when said first member and said second member are connected to each other.

5. A device according to claim 1 in which a plurality of said second members are secured to and extend radially from a post sleeve adapted to circumscribe each of a plurality of fence posts in secured preselected relationship thereto and a pair of said first members are secured to opposite ends of each of a plurality of fence rails operatively interposed between adjacent ones of said post sleeves.

6. A device according to claim 1 in which said second member has bumper means defined on the edge thereof facing said first member to engage said first member when said first member is connected to second member.

7. A device according to claim 6 in which said first pair of flanges on said first member includes means, when said flanges are engaged and supported by the flanges on said second member, coacting with said flanges on said second member to prevent said members from being pulled away from each other until said first member is raised relative to said second member a sufficient amount to disengage said means from said flange.

8. A device according to claim 7 in which each of said first pair of flanges has an axially extending body portion and an end portion formed integrally with said body portion and angularly disposed relative thereto and defining therewith an interior angle of approximately 115°–125°.

9. A quick disconnect linking device for joining two adjacent discrete members to each other comprising: a first member and a second member, said first member having a leading edge and a first and second pair of outwardly extending flanges' secured thereto extending outwardly past said leading edge, said first pair of flanges being disposed in spaced relationship to said second pair of flanges, each flange in each pair being disposed in spaced registered relationship to the other flange of said pair, each of said first pair of flanges having an axially extending body portion and an end portion formed integrally with said body portion and angularly disposed relative thereto and defining an interior angle therewith, said end portion being disposed in spaced relationship to said leading edge and defining a gap therebetween, said second pair of outwardly extending flanges having an elongated body portion extending outwardly beyond said leading edge approximately the same distance as does said end portion of each of said first pair of flanges and adapted to sandwich a portion of said second member therebetween; said second member having a body portion having front and rear surfaces, an upper and lower edge extending between said surfaces, and a leading edge extending between said upper and lower edges and between said surfaces; a pair of flanges respectively secured one to each of said surfaces adjacent said upper edge in spaced relationship thereto and in registry with each other, each of said flanges being positioned relative to said leading edge so that an extension of the axial center line of each flange defines with the plane of said leading edge an interior angle of 25 to 35 degrees, each of said flanges having an upper surface and a bearing surface adapted to engage and support a corresponding one of said first pair of said flanges on said first member when said first member and said second member are brought into axially aligned physical proximity to each other while fitting between said second pair of flanges on said first member; and a bumper member disposed upon said leading edge of said second member near the lower edge thereof and adapted to engage the leading edge of said first member when said first member and said second member are connected to each other.

10. A device according to claim 9 in which said second member has bumper means defined on the edge thereof facing said first member to engage said first member when said first member is connected to said second member.

11. A device according to claim 10 in which said first pair of flanges on said first member includes means, when said flanges are engaged and supported by the flanges on said second member, coacting with said flanges on said second member to prevent said members from being pulled away from each other until said first member is raised relative to said second member a sufficient amount to disengage said means from said flange.

12. A device according to claim 11 in which each of said first pair of flanges has an axially extending body portion and an end portion formed integrally with said body portion and angularly disposed relative thereto and defining therewith an interior angle of approximately 115°–125°.

13. A device according to claim 9 including means for locking said first member relative to said second member when said members are engaged in their linked position.

14. A device according to claim 9 in which said second member includes means for securing said member to a structure to support an appliance having said first member formed therewith.

15. A device according to claim 9 in which a plurality of said members are secured to the leading edge of a modular construction unit and a corresponding number of said second members are secured to the trailing edge of said unit, whereupon a plurality of such construction units can be serially connected by respectively raising, engaging, and lowering the leading edge of the unit to be secured relative to the trailing edge of a previously secured unit.

16. A device according to claim 9 in which a plurality of said second members are secured to and extend radially from a post sleeve adapted to circumscribe each of a plurality of fence posts in secured preselected relationship thereto and a pair of said first members are secured to opposite ends of each of a plurality of fence rails operatively interposed between adjacent ones of said post sleeves.

* * * * *